Jan. 27, 1953        G. R. RUEDI        2,626,521
MASONRY POINTING TOOL
Filed March 31, 1950
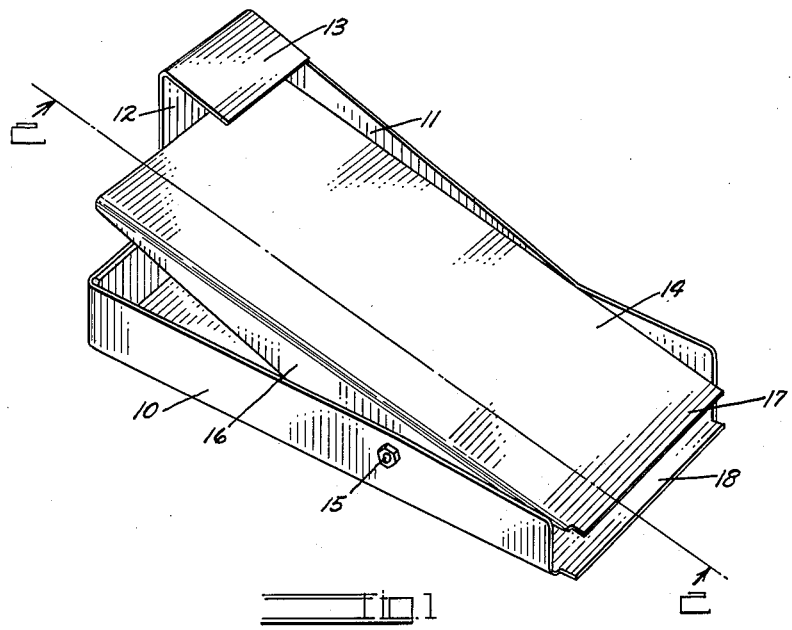
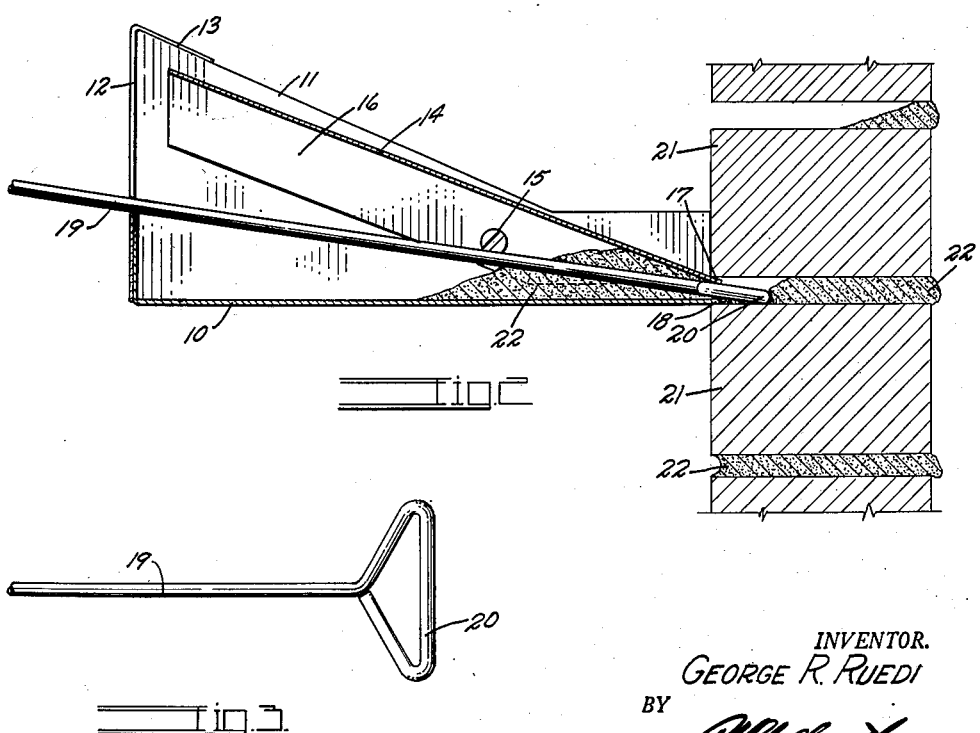
INVENTOR.
GEORGE R. RUEDI
BY
ATTORNEY Patented Jan. 27, 1953

2,626,521

UNITED STATES PATENT OFFICE 2,626,521

MASONRY POINTING TOOL

George R. Ruedi, Denver, Colo.

Application March 31, 1950, Serial No. 153,191

1 Claim. (Cl. 72—138)

This invention relates to a masonry pointing tool and has for its principal object the provision of a simple easily used device for renewing and replacing mortar between bricks and building stones in a wall.

Another object of the invention is to so construct the device that it will automatically adjust itself to different widths of mortar joints and so that it will grip and hold itself in place in the selected mortar joint.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of the improved pointing tool; and

Fig. 2 is a longitudinal section therethrough, taken on the line 2—2, Fig. 1, illustrating the tool in place in a conventional mortar joint. In Fig. 2 bricks of a wall are indicated at 21 and the mortar therebetween is indicated by the numeral 22.

Figure 3 is a view of the T-shaped plunger rod employed with the pointing tool of Figure 1.

The improved tool comprises an elongated mortar pan 10 having two side walls and a rear end wall, the front being open. One of the side walls, indicated at 11, is inclined upwardly as the rear of the pan is approached, and a portion of the end wall adjacent the side wall 11 is extended upwardly to the full height of the upwardly inclined side wall 11 to provide a relatively high extension of the end wall as shown at 12. The upper edge of the extension 12 of the end wall is bent forwardly to form a stop flange 13.

A tilting plate 14 is mounted between the side walls of the pan 10 upon hinge bolts 15. The plate 14 is provided with two downwardly turned side flanges 16, which fit snugly inside the sides of the pan 10 and through which the hinge bolts 15 pass. The tilting plate 14 terminates at its forward end in a projecting lip 17 and the bottom of the pan 10 terminates in a similar projecting lip 18.

The hinge bolts are positioned relatively closer to the open end of the pan than to the closed end thereof so that the arcuate movement will be greater at the rear of the pan than at the front thereof. The upward movement at the rear is limited by the stop flange 13.

A T-shaped plunger rod 19 is employed with the tool. The plunger rod is relatively flat and is provided with a wide head portion 20 having width substantially equal to the width of the pan 10.

In use, the pan 10 is turned on its side and partially filled with mortar. The mortar will be held in place by the high side wall 11, the high extension 12 on the end wall and the tilting plate 14. The pan is now turned to a horizontal position and the lips 17 and 18 are pressed between two of the bricks 21. The rear extremity of the plate 14 and the pan 10 are gripped between the thumb and fingers of one hand. This causes the lips 17 and 18 to tend to move away from each other so that they will grip outwardly against the edges of the adjacent bricks 21, as shown in Fig. 2.

The bottom and sides of the pan 10 cooperate with the inclined plate 14 and its flanges 16 to form an enclosed hopper like structure having an elongated opening communicating with the open joint between the bricks 21. The plunger 19 is now reciprocated back and forth to force the mortar 22 through this opening and pack it into the open joint between the bricks.

It will be noted that the upper lip 17 will rise to automatically accommodate any width of joint between the bricks. It will also be noted that the expanding action of the two lips 17 and 18 acts to support and hold the tool in place while the mortar is being forced into the joint. The lips 17 and 18 project beyond the side of the pan 10 so that the latter sides can rest against the bricks 21 to prevent leakage of mortar at the sides of the tool.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

A masonry pointing tool comprising: an open topped pan having an open front; a lower lip projecting forwardly from the bottom of the pan beyond the open front thereof; a tilting plate; pivot means tiltably mounting said tilting plate adjacent its forward extremity on and over said pan; a lip projecting forwardly from said tilting plate above and in alignment over said first lip, one side wall of said pan extending angularly upward alongside said tilting plate and closing the space between the rear extremity of the tilting plate and the pan when the latter extremity is at its maximum raised position; and an upwardly extending rear end wall portion on said pan extending to the maximum raised position of said extremity.

GEORGE R. RUEDI.

REFERENCES CITED

The following references are of record in the file of this patent:

UNITED STATES PATENTS

| Number | Name | Date |
| --- | --- | --- |
| 482,369 | Kruck | Sept. 13, 1892 |
| 1,467,323 | Jewell | Sept. 11, 1923 |
| 2,192,982 | Meendsen | Mar. 12, 1940 |
| 2,317,292 | Nash | Apr. 20, 1943 |
| 2,446,143 | Smith | July 27, 1948 |